United States Patent [19]
Scholl

[11] 3,821,625
[45] June 28, 1974

[54] CONTROL CIRCUIT WITH DEADBAND COMPENSATION FOR ELECTRICALLY ACTUATED DEVICES

[75] Inventor: Rolland D. Scholl, Peoria, Ill.
[73] Assignee: Caterpillar Tractor Co., Peoria, Ill.
[22] Filed: Sept. 18, 1972
[21] Appl. No.: 289,938

[52] U.S. Cl. .............................. 318/624, 244/77 M
[51] Int. Cl. ............................................. G05b 5/01
[58] Field of Search .................. 318/624; 244/77 M

[56] References Cited
UNITED STATES PATENTS

| | | | |
|---|---|---|---|
| 2,934,290 | 4/1960 | Dougan | 244/77 M |
| 3,440,504 | 4/1969 | Boskovich et al. | 318/624 X |
| 3,566,241 | 2/1971 | Ross | 318/610 X |
| 3,701,992 | 10/1972 | Allen | 318/624 |
| 3,702,149 | 11/1972 | Thompson | 318/624 X |

*Primary Examiner*—B. Dobeck
*Attorney, Agent, or Firm*—Phillips, Moore, Weissenberger, Lempio & Strabala

[57] ABSTRACT

A device, such as an electrical motor or an electrohydraulic valve controlling a fluid motor, which initiates movement of a load in response to electrical energization and which exhibits a significant deadband wherein load movement is not initiated until the applied energization rises to a sizable magnitude is provided with a control circuit which can effectively eliminate the deadband, thereby increasing sensitivity of response to control signals. The control signal is transmitted to the device through a first amplifier having an output which varies in accordance with the input signal whereby the rate of load motion is a function of control signal magnitude. To eliminate the deadband, a second amplifier is also connected between the device and the control signal source. The second amplifier has very high gain and an output signal magnitude limited to that needed to compensate for deadband in the device. Thus a control signal of any magnitude, including very small magnitudes, immediately applies energization to the device which compensates for the deadband thereof. The invention is applicable to both open loop systems wherein the control signal is produced by manually operated means, for example, and also to closed loop or servo systems. Deadband may be desirable in some open loop systems and the invention provides for optionally restoring deadband where it is preferable.

5 Claims, 4 Drawing Figures

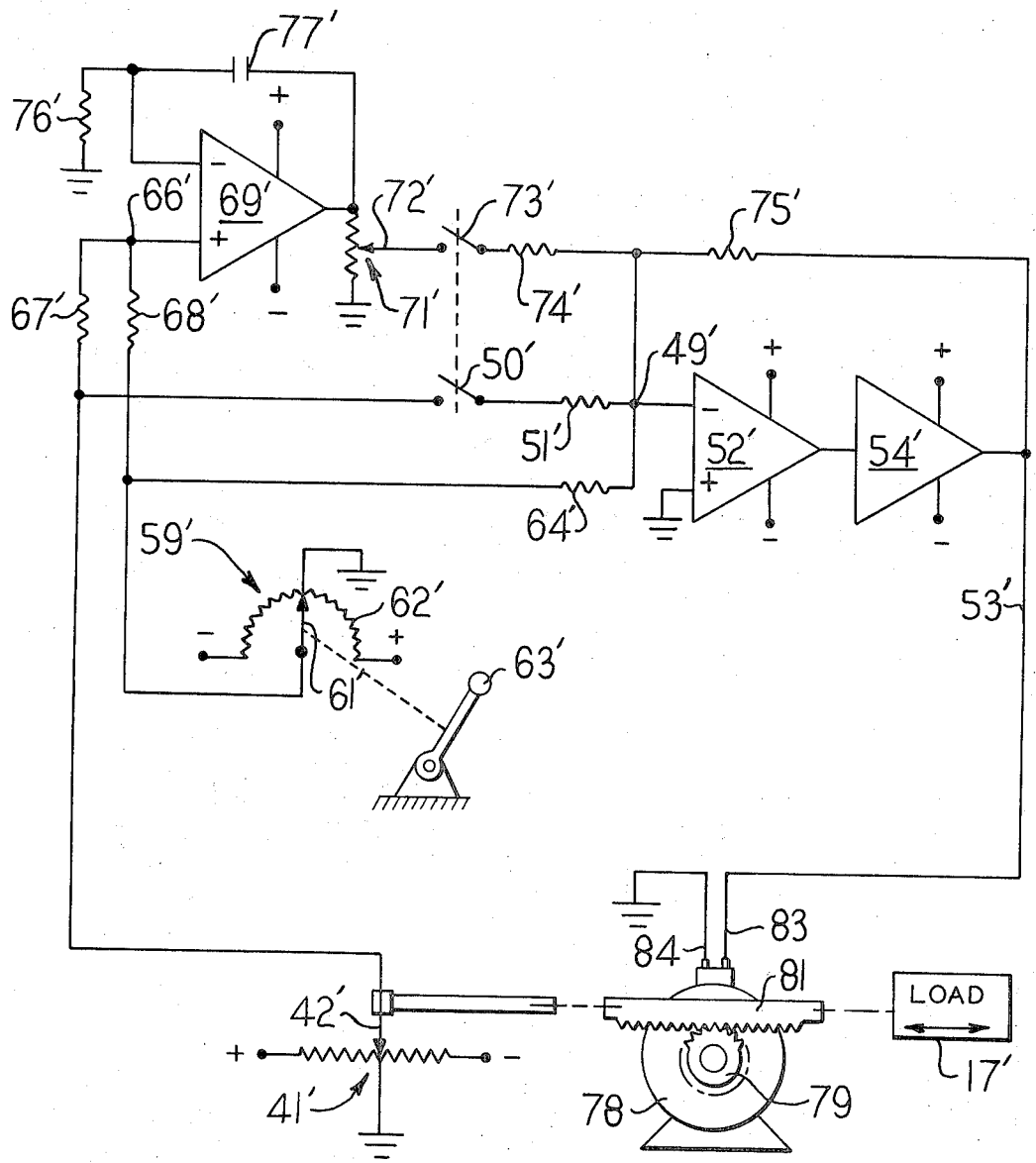

CONTROL CIRCUIT WITH DEADBAND COMPENSATION FOR ELECTRICALLY ACTUATED DEVICES

BACKGROUND OF THE INVENTION

This invention relates to means for controlling devices of the form which initiate motion of a driven element in response to electrical energization of the device.

Diverse different forms of powered mechanism include an element which is movable, usually in either of two opposite directions, by means of a device which is controlled by electrical signals. Such a device may be an electrical motor, for example, or an electrohydraulic valve supplying fluid to a fluid motor or any of various other mechanisms known to the art.

Such devices may exhibit a sizable degree of deadband with respect to the magnitude of applied electrical energization. In other words, the device may not initiate movement of the driven load element until the applied electrical energization reaches some specific magnitude or voltage well above null or zero. In the case of an electrical motor, this deadband may be due at least in part to the inertial and frictional resistance of the rotor to movement. If the applied energization may range from zero to plus or minus ten volts, for example, motor operation may not be initiated until the signal reaches at least plus or minus five volts. In the case of an electrohydraulic valve controlling a fluid motor, the deadband may be due in part to similar factors and also because of design characteristics deliberately intended to create deadband. In particular, such a valve may have a spool which is shifted to selectively open or close a passage and the lands on the spool may be deliberately made wider than the associated flow passages in order to minimize leakage when the valve is in the closed position. Thus a small initial amount of valve spool movement resulting from a small applied voltage does not open the passages and activate the associated fluid motor.

Devices of the kind discussed above may be designed to eliminate any significant amount of deadband. Low inertia electrical motors are available which in addition to having a very light weight rotor also have very low friction bearings. In the case of electrohydraulic valves, it is possible to design the valve spool so that there is substantially no deadband arising from spool land overlap of the associated passages. However, in many systems there are reasons why it may not be desirable to make use of these minimal deadband components.

One such reason and a very significant one is cost. In general, minimum deadband devices must be constructed with much more precision and require relatively expensive parts. Another reason is that some systems may be optionally operated in two different modes and in one of such modes the presence of deadband may actually be desirable. Most notably there are systems which may be selectively operated on either a closed loop or open loop basis. In closed loop or servo system operation involving feedback from the driven load to the control signal source deadband is generally undesirable as it reduces sensitivity and precision in the system. However, in an open loop system wherein the control signal magnitude is determined without feedback from the driven element, typically by manual operation of a control lever, deadband may not be objectionable and may in fact be desirable. An operator manipulating an open loop control has no difficulty in compensating for the presence of a certain amount of deadband at the off position of the control and the presence of such deadband may make the operator's task less taxing in terms of dexterity and precision of manual manipulation which is required. If response to control lever movement is extremely sensitive during open loop operation the system may respond to minute displacements of the lever from the off position thereby necessitating more or less continuous adjustments of the lever. Moreover, as pointed out above, devices of the form which exhibit considerable deadband tend to be more economical and are therefore preferable on this basis alone wherever it is possible to make use of such device.

SUMMARY OF THE INVENTION

This invention is a control circuit for an electrically actuated device of the kind discussed above wherein the device, in the absence of compensating means, exhibits a sizable deadband. The control circuit includes means which in effect eliminates deadband whereby such devices may readily be employed in closed loop systems as well as in open loop systems. In one form of the invention means are provided for selectively inactivating the deadband compensation whereby the single system may be optionally operated in either of an open and a closed loop mode.

The invention provides means for transmitting a basic control signal of variable magnitude to the electrically actuated device and further includes an amplifier coupled between the control signal source and the device which amplifier has very high gain and a fixed maximum output signal just sufficient to shift the device out of the deadband range, the amplifier output being added to the basic control signal. Thus an incrementally small basic control signal from the source, which in itself would be insufficient to overcome the deadband inherent in the device, causes sufficient energization to be applied to the device to initiate immediate movement of the driven element. Deadband may be restored, when desirable, by opening the amplifier circuit.

Accordingly, it is an object of this invention to counteract the undesirable effects of deadband in devices of the form which initiate movement of an element in response to an electrical control signal.

It is an object of this invention to enable the efficient use of electrically actuated devices characterized by sizable deadband in systems, including closed loop systems, where such devices have not heretofore been considered desirable.

It is another object of this invention to provide a control circuit for an electrically actuated device wherein said device may optionally be caused to exhibit deadband or to effectively eliminate said deadband.

The invention together with further objects and advantages thereof will best be understood by reference to the following description of preferred embodiments taken in conjunction with the accompanying drawings.

BRIEF DESCRIPTION OF THE DRAWINGS

In the accompanying drawings:

FIG. 4 is a schematic circuit diagram of a second embodiment of the invention showing the control circuit adapted for operation of an electrical motor.

DESCRIPTION OF PREFERRED EMBODIMENTS

Figure 1:
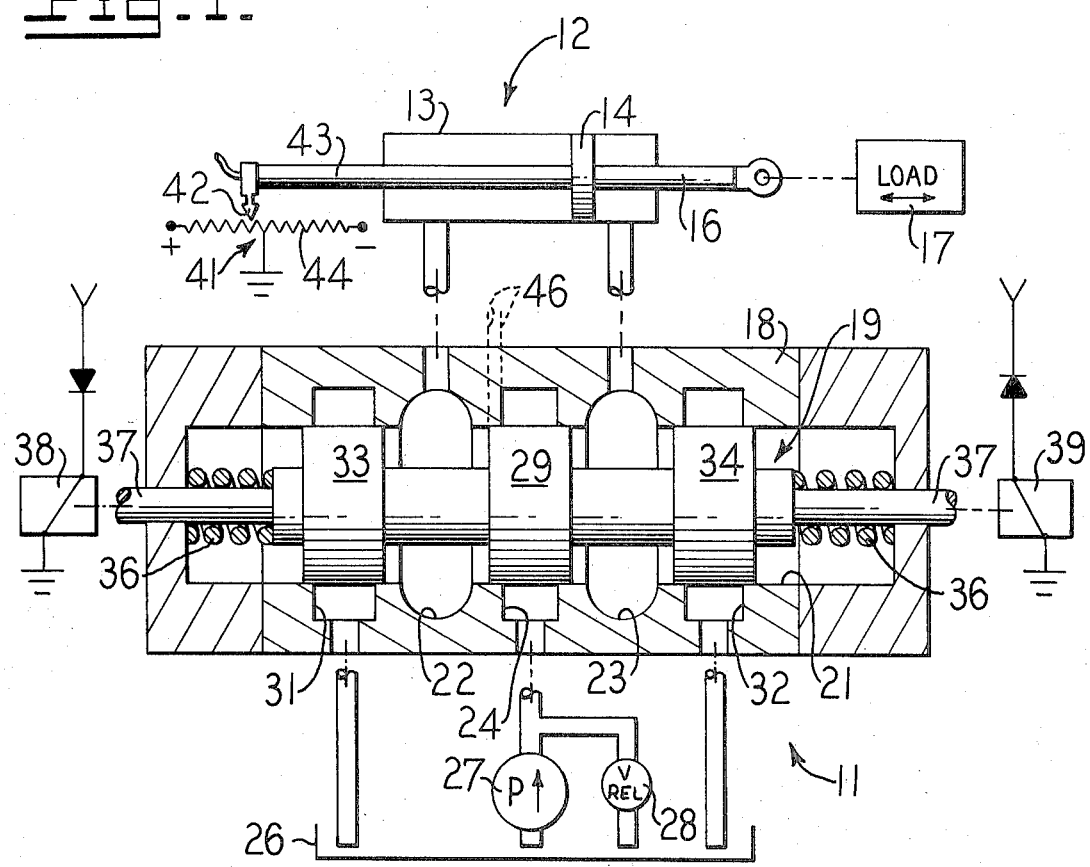
FIG. 1 is an axial section view of an electrohydraulic valve and fluid motor controlled thereby with certain associated electrical and hydraulic components being shown schematically and illustrating the presence of deadband intentionally designed into said valve.

Referring initially to FIG. 1 of the drawings, one form of electrohydraulic valve 11 for controlling a linear fluid motor 12 is shown in detail for the purpose of illustrating factors which can give rise to deadband in devices of this general class. The fluid motor 12 which is controlled by valve 11 may be of conventional form and thus includes a cylinder 13 having an axially movable piston 14 therein and a rod 16 extending axially from the piston and cylinder for connection to a load element 17 which may be moved by actuation of the motor.

The load 17 moved by motor 12 may be any of diverse elements in a variety of mechanisms, suitable examples of which are known to the art. The invention was initially devised, for example, for use in conjunction with a control system for positioning the earthworking blade of a motor grader relative to the vehicle frame as disclosed in U.S. Pat. No. 3,486,564. This is but one example of usage of the invention which can be applied to many other control systems.

In this example, valve 11 has a body 18 and a spool 19 slidable within a bore 21 of the housing. A pair of spaced apart annular grooves 22 and 23 of bore 21 communicate with the head end and rod end respectively of the fluid motor 12 and an additional groove 24 situated between grooves 22 and 23 receives pressurized fluid from a reservoir 26 through a pump 27. The output of pump 27 is communicated with the reservoir 26 through a relief valve 28 which establishes a predetermined maximum fluid pressure in the system. Spool 19 has a central land 29 which blocks groove 24 from both of grooves 22 and 23 when the spool is centered in bore 21 thereby immobilizing motor 12. Axial movement of the spool 19 in either direction transmits fluid from pump 27 to one end of motor 12 while providing a fluid discharge path from the other end. In order to provide the discharge path for fluid from one end of motor 12 during operation, bore 21 has additional grooves 31 and 32 spaced outwardly from grooves 22 and 23 respectively. With the spool 19 in the centered position, a pair of lands 33 and 34 block grooves 31 and 32 respectively from the adjacent grooves 22 and 23. Movement of the spool 19 away from the centered position acts to communicate one of the grooves 31 and 32 with the adjacent one of grooves 22 and 23 to provide the discharge path back to reservoir 26.

Springs 36 disposed at opposite ends of spool 19 within bore 21 exert a force tending to center the spool within the bore. Thus in the absence of additional forces, motor 12 is immobilized. To provide for activation of motor 12 in response to DC electrical energization, rods 37 extend axially from each end of spool 19 to connect with solenoids 38 and 39 situated at opposite ends of the valve. Energization of one of the solenoids 38 and 39 acts to shift the valve spool 19 away from the centered position to activate the motor, the amount of spool movement and thus the rate of motor operation being dependent on the magnitude of the electrical voltage applied to the solenoid. In the example shown, energization of solenoid 38 shifts the valve spool 19 in a direction causing motor 12 to retract while energization of solenoid 39 shifts the spool to cause motor 12 to extend. To provide a feedback signal for operation in a closed loop mode as will hereinafter be described, a first potentiometer 41 has a movable contact 42 linked to motor piston 14 by suitable means 43 and which is slidable along a resistance 44 having positive and negative voltages applied to opposite ends thereof from a suitable source and which is grounded at the midpoint.

Considering now the factors which give rise to deadband in the mechanism described above, spool inertia and friction offer resistance to spool movement with the result that the valve 11 would not respond to a very small magnitude of voltage applied to one of the solenoids 38 and 39 in the absence of compensating means. However, these sources of deadband are relatively minor in this form of valve wherein the lands 29, 33 and 34 have been deliberately designed to introduce a sizable amount of deadband. In particular, as illustrated by dashed lines 46, each such land is of substantially greater extent in the axial direction than the associated groove and thus overlaps the associated groove when the spool is in the centered position. As a consequence, a small amount of initial spool movement does not actuate motor 12. The voltage applied to one of the solenoids 38 and 39 must rise to a specific value substantially above zero before the spool 19 is shifted sufficiently to begin actuation of motor 12. The range of applied electrical voltages which are of insufficient magnitude to initiate actuation of motor 12 constitutes the deadband of the system.

One reason that the overlap 46, which gives rise to sizable deadband, is deliberately provided in the valve 11 is to reduce fluid leakage between the several grooves of the valve when the spool is in the centered position. Such leakage can cause unwanted drift of the motor and load. Another reason is that in an open loop mode of operation, the presence of deadband may be desirable so that a manual control need not be manipulated repeatedly and with extreme precision in order to avoid unintentional motor movements.

Figure 2:
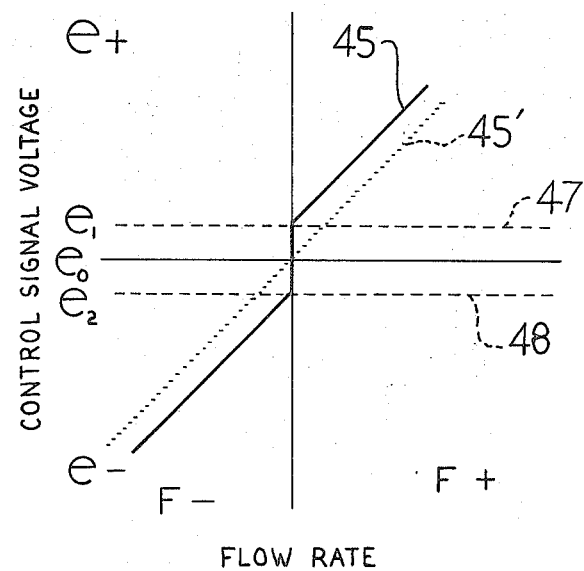
FIG. 2 is a graphical illustration of flow through the valve of FIG. 1 as a function of the voltage of the electrical energization applied to the valve, further illustrating the effects of deadband in said valve.

The effects of the deadband in the valve and motor system of FIG. 1 are illustrated graphically in FIG. 2. In the absence of deadband compensation, the energization applied to one of the solenoids must reach a sizable voltage ($e_1$ or $e_2$) above or below the neutral or ground level ($e_0$) before fluid begins to flow through the valve as indicated by solid line 45. Once the applied voltage has reached this specific magnitude, $e_1$ or $e_2$, then flow through the valve commences and increases as a function of the magnitude of the applied voltage. Thus in FIG. 2 dashed lines 47 and 48 define the range of applied voltages which constitute the deadband. Dotted line 45' indicates the response of the valve with the deadband compensated for by the control circuit to be hereinafter described.

Figure 3:
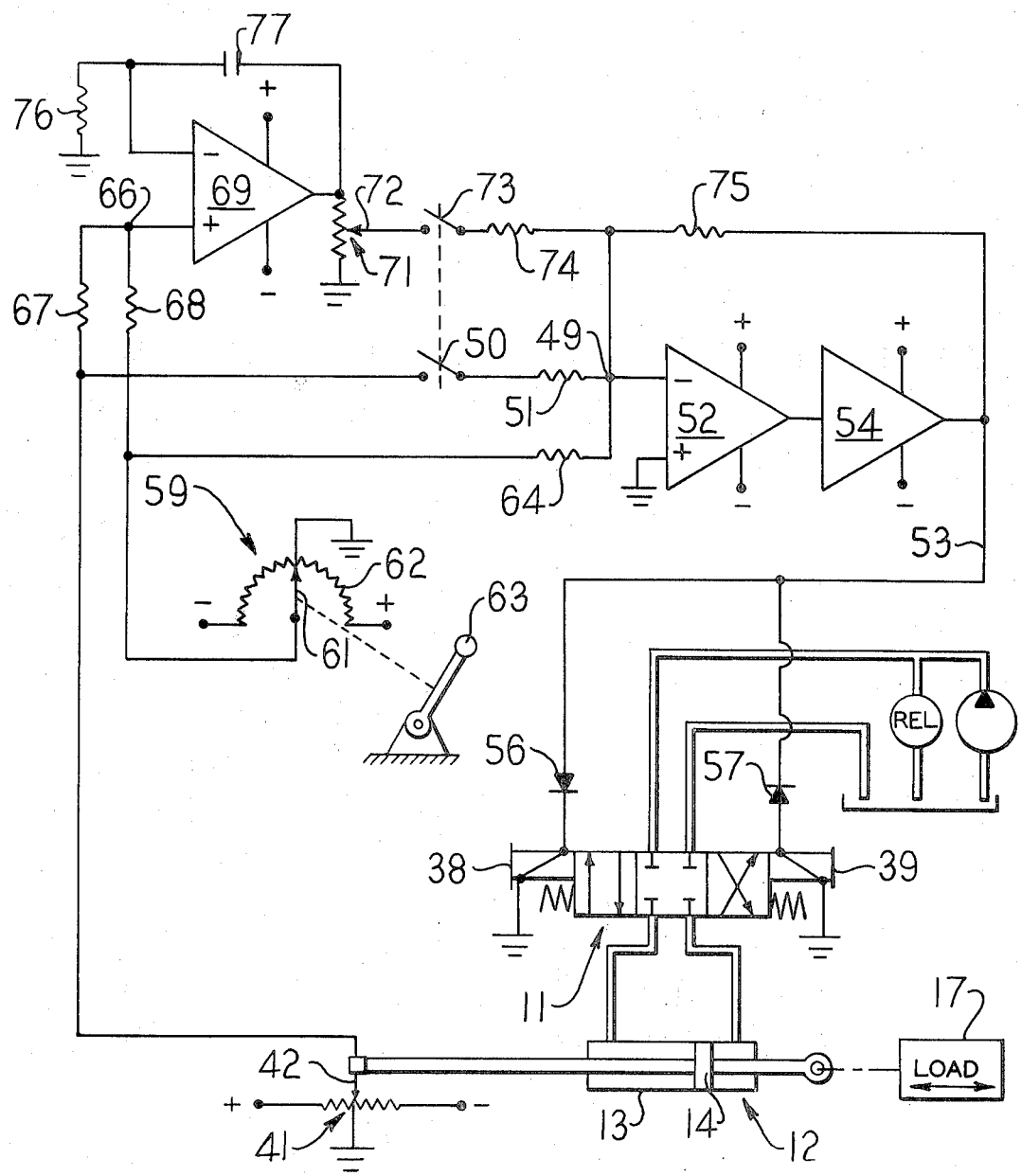
FIG. 3 is a schematic circuit diagram showing the valve of FIG. 1 and the motor controlled thereby together with a first embodiment of the electrical control circuit of the present invention shown adapted for optional open loop or closed loop operation.

Referring now to FIG. 3, valve 11 and motor 12 are shown in schematic form together with the associated control circuit which provides for optional operation in a closed loop mode as well as an open loop mode and which includes means for effectively eliminating the deadband only while operating in the closed loop mode.

As hereinbefore discussed, first potentiometer 41 provides a position signal at movable contact 42 which varies in polarity and magnitude according to the position of the load 17 and which is at ground potential when the piston 14 is centered in cylinder 13. Such signal is transmitted to a first summing junction 49 through a switch 50 and an input resistor 51. Summing junction 49 is connected to the inverting input of a first operational amplifier 52 having the other input grounded. The output of amplifier 52 is of opposite polarity from the voltage at summing junction 49 and has a magnitude which varies in accordance with such voltage. The output signal from amplifier 52 is connected to a conductor 53 through a current amplifier 54 which boosts output power to a value sufficient to operate the valve solenoids 38 and 39. Conductor 53 is branched to connect with each of the solenoids 38 and 39 with a diode 56 being connected between conductor 53 and solenoid 38 and another diode 57 being connected between conductor 53 and solenoid 39. Diode 56 is oriented to transmit positive voltage from conductor 53 to solenoid 38 while blocking negative voltages therefrom and diode 57 is inverted to conduct negative voltage to solenoid 39 while blocking positive voltage therefrom.

A second potentiometer 59 provides a means for manually regulating the operation of motor 12 in the open loop mode of operation and for determining the position to which the load is automatically shifted and maintained in the closed loop mode of operation. Potentiometer 59 has a contact 61 movable along a resistance 62 which is center tapped to ground and which has positive and negative voltages applied to opposite ends thereof. Movable contact 61 is adjustable manually by suitable means such as an operator's control lever 63. Movable contact 61 is connected to the first summing junction 49 through a second input resistor 64. Thus with switch 50 closed the control voltage applied to the inverting input of amplifier 52 is the algebraic summation of the position signal from potentiometer 41 and the command signal from potentiometer 59.

With switch 50 closed to establish closed loop or servo operation, the setting of potentiometer 59 determines the particular position to which the load 17 will be automatically moved and then maintained. This position may be changed by adjusting the control lever 63. This does not require continued manual manipulation of control lever 63 while the motor is operating as in the open loop mode. Whenever the summation of the signals from potentiometers 41 and 59 differs from ground or zero voltage, the resultant control signal at summing junction 49 is amplified and transmitted to valve 11 to cause operation of motor 12 in a direction tending to reduce such control signal to zero. Accordingly, motor 12 is energized automatically until the signal from potentiometer 41 becomes equal in magnitude but of opposite polarity relative to the signal from potentiometer 59 at summing junction 49.

If open loop operation is desired wherein the operator continually manipulates lever 63 during motor operation to start and stop the motor and to control the rate of load movement then switch 50 is opened. With switch 50 open, the position (feedback) signal from potentiometer 41 cannot reach summing junction 49 and valve 11 responds only to the signal originating from the manually controlled potentiometer 59.

With regard to the closed loop mode of operation, the system as described above for purposes of example is of the type in which a command signal is selected by manual adjustment of a potentiometer 59. The system then automatically shifts the load 17 to the position represented by such adjustment and maintains the load at such position if forces are present tending to cause the load to drift away from the selected position. There are many other types of closed loop system wherein the command signal is not fixed manually, as by a lever 63, but originates from some sensing device monitoring a variable external factor to which load position must be correlated. The present invention is equally applicable to such systems wherein the operators control lever 63 and potentiometer 59 are replaced with some other command signal producing means.

Considering now the means by which the deadband otherwise inherent in valve 11 is effectively eliminated, in the closed loop mode of operation, the signals from movable contacts 42 and 61 of potentiometers 41 and 59 respectively are also transmitted to a second summing junction 66 through additional input resistors 67 and 68 respectively. Summing junction 66 is connected to the non-inverting input of an additional operational amplifier 69. Unlike amplifier 52, amplifier 69 has a very high, preferably near infinite, gain so that an incrementally small input saturates the amplifier to produce a fixed maximum output voltage. The output of amplifier 69 is connected to ground through the resistance element of a third potentiometer 71 having an adjustable contact 72. Contact 72 is connected to the first summing junction 49 through a switch 73 linked to switch 50 for operation therewith and through an input resistor 74.

Further components of the circuit include a compensating feedback resistor 75 connected across the output of amplifier 54 and the input of amplifier 52. A resistor 76 and a feedback capacitor 77 are connected between ground and the output of amplifier 69, the inverting input of which is connected to a junction therebetween for stabilizing purposes and to establish desired gain and response values in the amplifiers.

The potentiometer 71 is adjusted so that the maximum output signal from compensating amplifier 69, when transmitted through amplifiers 52 and 54, is just sufficient to shift valve 11 enough to eliminate the spool overlap which is the principal cause of deadband.

Accordingly, the deadband compensating signal is transmitted to junction 49 for combination with the command signal from potentiometer 59 and the position signal from potentiometer 41 to determine the net voltage applied to the valve 11. Owing to the above described action of amplifier 69, this net applied voltage always shifts immediately between the values $e_1$ and $e_2$ of FIG. 2 when the polarity of potentiometer contact 42 changes relative to that of potentiometer contact 61. While in theory there might be no voltage applied to the valve 11 at times when the load 17 is at the precise position determined by the setting of potentiometer 59, this tends to be an unstable condition in practice. Generally, there is always a voltage applied to valve 11 at least equal to $e_1$ and $e_2$ and the voltage tends to oscillate irregularly between these two values while the motor is inactive.

In operation the closed loop mode of operation is initiated by closing switches 50 and 73. Under this condition, any very small difference between the magnitudes of the opposite polarity voltages at contacts 42 and 61 initiates immediate motor operation as the high gain amplifier 69 responds to such a small control signal by applying a predetermined larger signal to summing junction 49 which is just sufficient to shift the valve 11 to eliminate the deadband. In the absence of the deadband compensation signal, the voltage difference would have to increase substantially before the valve shifted sufficiently to actuate the motor 12. Opening of switches 50 and 73 acts to remove the deadband compensation signal from junction 49 and converts the system for open loop operation wherein the presence of deadband may be preferable. In open loop operation, motor 12 may be started by manually shifting lever 63 away from the position at which contact 61 receives ground potential by an amount sufficient to overcome the deadband and the motor may be selectively stopped by restoring the lever to such position.

The invention is not confined to deadband compensation in systems having an electrohydraulic valve as described above. Other devices which initiate movement of an element in response to electrical control signals may also exhibit sizable deadband for different reasons. In some forms of electrical motor, inertia and friction can create significant deadband wherein input voltages of small magnitude are insufficient to initiate turning of the rotor. As depicted in FIG. 4, the hereinbefore described control circuit may be utilized with a DC motor 78 of the form which is reversible by reversing polarity of applied current. In the example shown, motor 78 turns a pinion gear 79 engaging with a rack 81 coupled to the load element 17' which is to be positioned. The control circuit of FIG. 4 may be similar to that previously discussed and accordingly will not be redescribed, reference numerals similar to those previously used but having a prime mark being present in FIG. 4 to designate corresponding elements. In this embodiment, the movable contact 42' of first potentiometer 41' is linked to the rack 81 while the conductor 53' is connected to one terminal 83 of the motor 78 with the other motor terminal 84 being grounded. As in the previous instance, a very small voltage magnitude difference between contacts 42' and 61' which by itself would be insufficient to actuate the motor 78, does in fact cause immediate motor operation in that such signal is amplified by amplifier 69' to a value just sufficient to start motor operation, the operation of the electrical portion of the system being similar to that previously described.

While the invention has been described with respect to certain preferred embodiments, it will be apparent that many other modifications are possible and it is not intended to limit the invention except as defined in the following claims.

What is claimed is:

1. A control circuit for a device which initiates motion of an element in response to electrical energization, which device is unable to initiate said motion in response to electrical energization of less than a specific magnitude, said control circuit comprising:
   means for producing a control signal of variable magnitude,
   means for transmitting said variable magnitude control signal from said control signal producing means to said device, and
   deadband compensation signal means connected between said control signal producing means and said device for producing a compensation signal of predetermined magnitude, in response to a control signal, which compensation signal is added to said control signal to apply energization of at least said specific magnitude to said device in response to a control signal of substantially any magnitude, wherein said deadband compensation signal means comprises an amplifier having an input connected to said control signal producing means to receive said control signal therefrom and having an output coupled to said device, said amplifier being a high gain amplifier having a maximum output signal magnitude equal to said predetermined magnitude whereby said compensation signal reaches said predetermined magnitude in response to a control signal of substantially less magnitude than said specific magnitude.

2. A control circuit for a device which initiates motion of an element in response to electrical energization wherein said device is of the form initiating motion of said element in one direction in response to energization of positive polarity and initiating motion in an opposite direction in response to energization of negative polarity, which device is unable to initiate said motion in response to electric energization of less than a specific magnitude, said control circuit comprising:
   means for transmitting a variable magnitude control signal to said device including a first summing junction through which said control signal is transmitted to said device,
   means for producing a control signal of variable magnitude comprising means for responding to movement of said element away from a predetermined position by producing a positive control signal when said movement is in a first direction and by producing a negative control signal when said movement is in an opposed direction whereby said control circuit and said device constituted a closed loop servo system acting to shift said element to said predetermined position and to maintain said element thereat, said control signal producing means further comprising means linked to said element for producing a position signal having a polarity dependent on the direction of displacement of said element from a specific position and a magnitude dependent on the amount of said displacement, means for transmitting said position signal to said first summing junction, means for producing a command signal of selectable polarity and magnitude and means for transmitting said command signal to said first summing junction for combination with said position signal to derive said control signal whereby said device is caused to move said element until said position and command signals are equal in magnitude and of opposite polarity and cancel out at said first summing junction, and
   deadband compensation signal means connected between said control signal producing means and said device for producing a compensation signal of predetermined magnitude in response to a control signal, which compensation signal is added to said control signal to apply energization of at least said specific magnitude to said device in response to a control signal of substantially any magnitude, wherein said deadband compensation signal means comprises a second summing junction also receiving said position signal and said command signal, an amplifier having an input coupled to said second summing junction and having high gain to produce an output signal of fixed magnitude in response to input signals of substantially any magnitude, and means coupling said output of said amplifier to said first summing junction.

3. The combination defined in claim 2 wherein said means coupling said output of said amplifier to said first summing junction comprises adjustable means for selectively adjusting the magnitude of the signal transmitted from said amplifier output to said first summing junction.

4. A control circuit for a servomechanism which responds to positive electrical energization by shifting an element in one direction at a rate proportional to the magnitude of said positive energization and which responds to negative electrical energization by shifting said element in an opposite direction at a rate proportional to the magnitude of said negative energization and wherein said servomechanism, in the absence of compensating means, exhibits a deadband in which positive and negative energization of less than a specific magnitude is unable to initiate movement of said element, said control circuit comprising:

control signal source means coupled to said element for producing a control signal in response to displacement of said element from a specific position, wherein said produced control signal has a polarity dependent on the direction of said displacement and a magnitude dependent on the amount of said displacement, means including a first amplifier for transmitting said control signal from said source to said servomechanism whereby said servomechanism is energized to move said element to said specific position, and deadband compensation means including a second amplifier connected between said source and said servomechanism, said second amplifier having a gain substantially higher than that of said first amplifier and having a maximum output signal selected to apply energization of said specific magnitude to said servomechanism in response to a control signal of substantially any magnitude whereby said servomechanism is caused to respond to signals from said source which have magnitudes substantially less than said specific magnitude that is otherwise needed to actuate said servomechanism to move said element.

5. The combination defined in claim 4 wherein said control signal source comprises a first potentiometer having a movable contact coupled to said movable element for producing a voltage dependent on the position of said element and further comprises a second potentiometer having a manually movable contact for producing a second selectable voltage, and wherein said control circuit further comprises summing junction means coupled to said movable contacts of said first and second potentiometer and coupled to the inputs of said first and second amplifiers whereby both of said amplifiers receive input voltages which are a summation of voltages from said first and second potentiometers whereby said specific position to which said servomechanism moves said element may be selected by adjustment of said second potentiometer.

* * * * *